United States Patent [19]

Harnden et al.

[11] 3,853,736

[45] *Dec. 10, 1974

[54] ELECTROFLOTATION APPARATUS

[75] Inventors: Warren B. Harnden, Rockford, Ill.; Eugene H. Morrill, Marathon, Fla.

[73] Assignee: Illinois National Bank & Trust Co., trustee under trust, Rockford, Ill.

[ * ] Notice: The portion of the term of this patent subsequent to Apr. 10, 1990, has been disclaimed.

[22] Filed: Mar. 23, 1973

[21] Appl. No.: 344,195

Related U.S. Application Data

[63] Continuation-in-part of Ser. No. 143,305, May 14, 1971, Pat. No. 3,726,780.

[52] U.S. Cl.............. 204/269, 204/149, 204/275, 210/221
[51] Int. Cl............................................. B01k 3/00
[58] Field of Search ........... 204/149, 269, 270, 275, 204/278; 210/44, 221

[56] References Cited
UNITED STATES PATENTS 3,479,281  11/1969  Kikindai et al. ............. 204/149 X
3,523,891  8/1970  Mehl ........................... 204/149 X FOREIGN PATENTS OR APPLICATIONS
676,854  8/1952  Great Britain .................. 204/186

Primary Examiner—John H. Mack
Assistant Examiner—W. I. Solomon

[57] ABSTRACT

A tank, having a height several times its effective diameter, has a plurality of horizontal electrodes disposed throughout its entire height. Conduits and controls are provided for downflow of liquid to be purified in a non-turbulent manner. Electrolysis of the liquid causes gas bubbles to flow upwardly. This apparatus creates a non-turbulent flow of liquid directly counter to the flow of gas bubbles for a substantial vertical distance. In one embodiment the tank is a cylinder, while in another it has downwardly converging sides. A third embodiment shows two compartments arranged for sequential flow of liquid therethrough.

20 Claims, 7 Drawing Figures

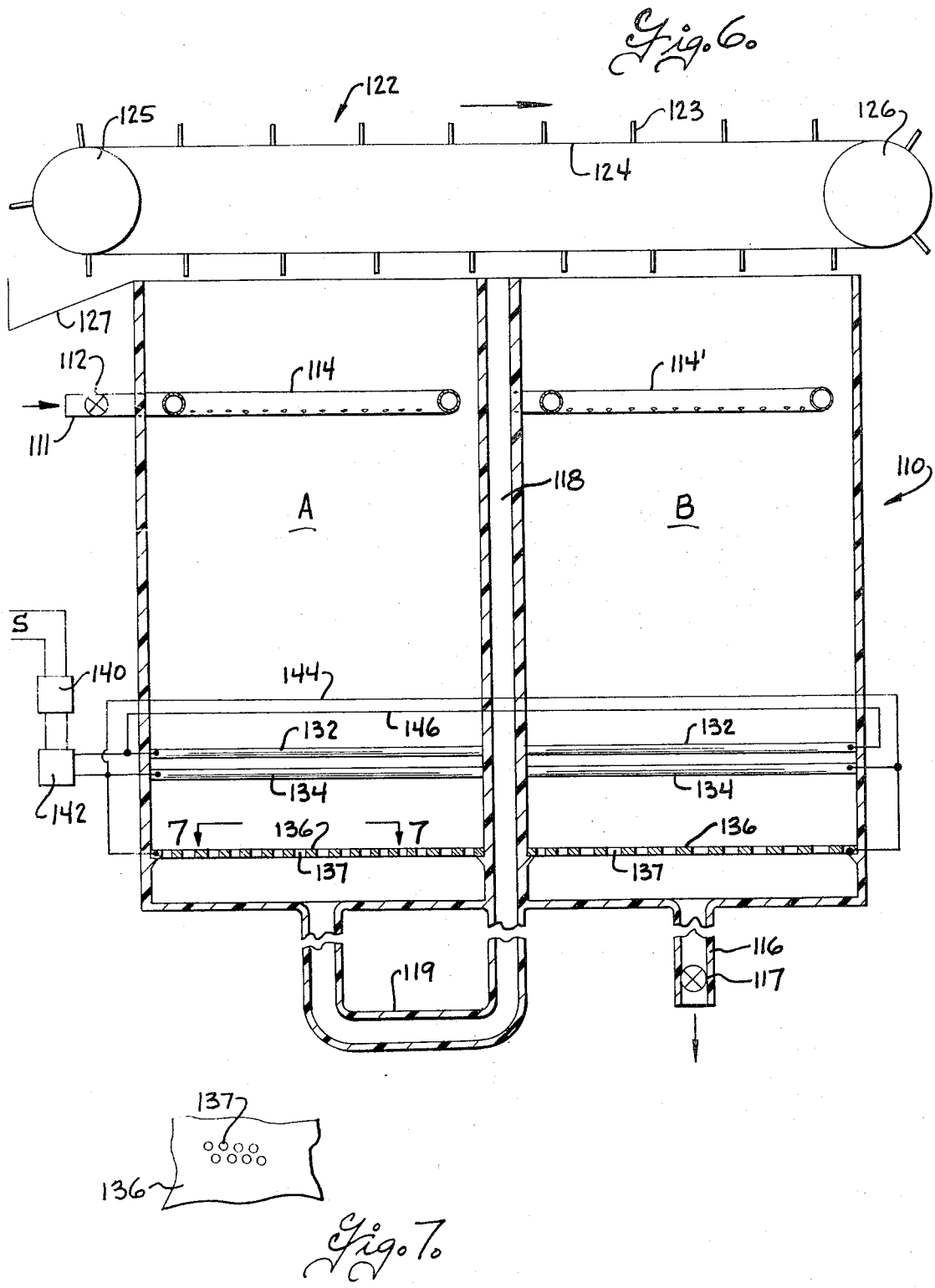

ELECTROFLOTATION APPARATUS

CROSS-REFERENCE

This application is a continuation-in-part of application Ser. No. 143,305, filed May 14, 1971, now U.S. Pat. No. 3,726,780.

BACKGROUND

The invention pertains generally to liquid purification and more particularly to apparatus for liquid purification by electroflotation.

Flotation equipment has been used to separate liquid from suspended solids or immiscible liquid in suspension. Electrolytic equipment has been used to produce a rising flow of gas bubbles for flotation but at least some of this equipment has been expensive to operate.

Known electrolytic flotation tanks do not achieve maximum efficiency from the rising current of gas bubbles. One such tank has a rectangular configuration and liquid flows horizontally through the tank while rising bubbles lift impurities to the surface. In such a tank there is unequal loading on the electrodes between the point where liquid is introduced and where effluent is removed.

U.S. Pat. No. 3,479,281, issued Nov. 18, 1969 to Kikindai et al. has a single pair of foraminous electrodes for generating gas bubbles and a turbulent zone above it for uniform distribution of the suspended phase throughout the mass of liquid. It has been discovered that it is desirable to eliminate any turbulence. U.S. Pat. No. 3,552,571; issued Jan. 5, 1971 to Neuspiel et al. discloses an improvement which includes a rotating distributor arm above the electrodes, and a rotating effluent collection arm below the electrodes. It is desirable to have a more efficient, yet simplified, electroflotation apparatus.

SUMMARY

The present invention relates to apparatus for the purification of liquid by electroflotation.

It is a general object of the invention to provide an electroflotation apparatus which is more efficient and simplified than prior apparatus.

Another object is to provide an electroflotation apparatus which eliminates any turbulence.

Still another object is to provide an electroflotation apparatus which creates a non-turbulent flow of liquid directly counter to the flow of gas bubbles for a substantial vertical distance.

Another object is to provide an electroflotation apparatus in accordance with the preceding object and which has apparatus at the top and the bottom of the tank to equalize the flow across the cross-sectional area of the tank.

Another object of the invention is to provide an electroflotation apparatus which has a greater area of negative electrodes than positive electrodes.

Yet another object is to provide a new and improved electroflotation apparatus having horizontally disposed electrodes between the top and bottom of the tank and having a negatively charged surface at the bottom of the tank.

These, and other objects and advantages of the present invention, will become apparent as the same becomes better understood from the following detailed description when taken in conjunction with the accompanying drawings.

DRAWINGS

FIG. 6 is a view, partly in section and partly diagrammatic, of a third embodiment of the invention; and FIG. 7 is a fragmentary plan view as seen from line 7—7 in FIG. 6.

DESCRIPTION

Figure 1:
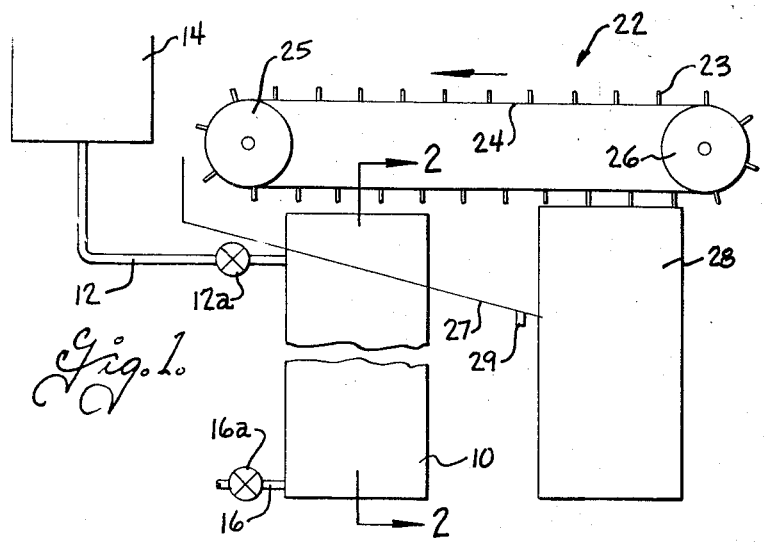
FIG. 1 is a diagrammatic view of an electroflotation apparatus embodying the present invention.

Reference is now made more particularly to the drawings which illustrate the best presently known mode of carrying out the invention and wherein similar reference characters indicate the same parts throughout the several views.

In general, the apparatus diagrammatically illustrated in FIG. 1 includes an electroflotation tank 10 which is open at the top and formed of insulative material such as fiberglass, acrylic, glass, or other suitable material. The tank has an influent conduit 12 which admits liquid to be treated from a reservoir 14 into the top of the tank. An effluent conduit 16 withdraws purified liquid from the bottom of the tank. Valves 12a and 16a, associated with conduits 12 and 16, respectively, control the flow through the tank 10 at a rate so that there is no turbulence in the tank. Preferably, the tank 10 has a height several times its diameter for a reason hereafter explained.

Any floc which rises to the top of the tank 10 is removed from the surface by a conveyor generally designated 22. While the floc may be removed by any acceptable means, the conveyor 22 is shown as having a plurality of paddles 23 mounted on a continuous band 24 which travels around driven rollers 25 and 26. A trough 27 receives the discharge floc and transports it to a receiving tank 28 or dispenses it through an outlet 29.

Figure 2:
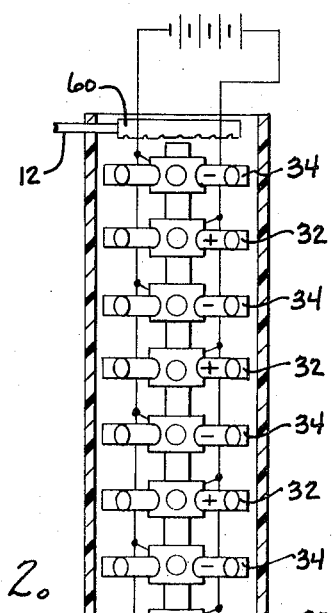
FIG. 2 is an enlarged vertical sectional view taken generally along line 2—2 of FIG. 1.

In FIG. 2, the tank 10 is shown in the form of a right cylinder having a circular cross-section and with a height to diameter ratio of about 5 to 1. While other shapes are contemplated, it is preferable that the tank have a height of at least twice its effective diameter so that the flow therethrough is assured to be directly counter to the flow of the rising gas bubbles. The term "effective diameter" means the average width of the tank 10. A shallow tank having a height to effective diameter ratio of about 1 to 1 does not assure this desirable counterflow. The tank, having a height of at least twice, and preferably several times its effective diameter, aids in assuring the non-turbulent flow mentioned above.

A plurality of positive electrodes 32 and a plurality of negative electrodes 34 are disposed horizontally in the tank 10. As an example of suitable materials, the negative electrodes 34 are made of carbon and the positive electrodes 32 are made of "Duriron". Preferably, these electrodes are vertically spaced from each other along at least a major portion of the height of the tank and, advantageously, the full height of the tank, as shown in FIG. 2. It has been found preferable that there be a greater number of negative electrodes 34 than positive electrodes 32, as shown, and that there be a concentration of negative electrodes adjacent the bottom of the tank 10. This assures that there is a large negative polar charge adjacent the bottom, without any gas bubbles being formed thereat, to repel the negatively charged floc. This negative charge provides a quiescent zone which acts as a buffer to prevent any floc from being discharged through the effluent line 16.

Milk water waste, oily waste water, and dye plant waste have been effectively treated with the above apparatus. Various coagulants are added depending on the type of waste. Typical coagulants include aluminum sulfate, ferric chloride, lime, hydro sodium sulfate, and poly electrolytes such as "Nacolyte 607" sold by Nalco Chemical Company. In treating milk water waste, for example, it has been possible to easily obtain a treatment of two times the capacity of the tank per hour and up to four times the capacity.

Figure 4:
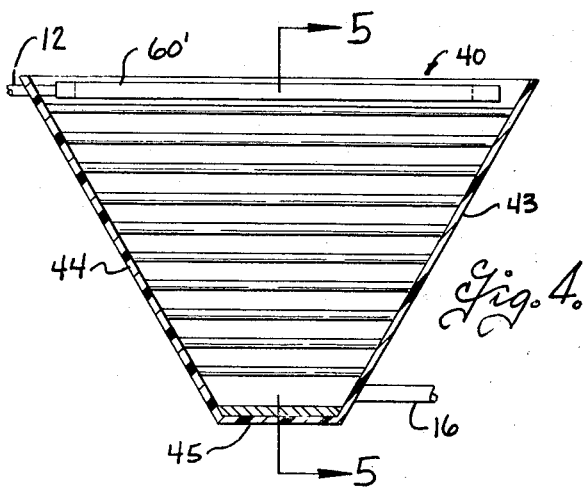
FIG. 4 is a longitudinal sectional view of another embodiment of the invention.
Figure 3:
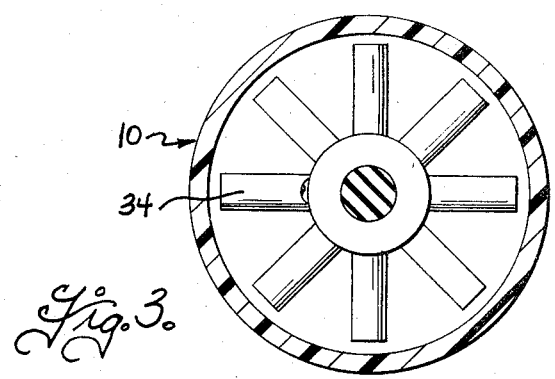
FIG. 3 is a horizontal sectional view taken along line 3—3 of FIG. 2 and on a still larger scale.
Figure 5:
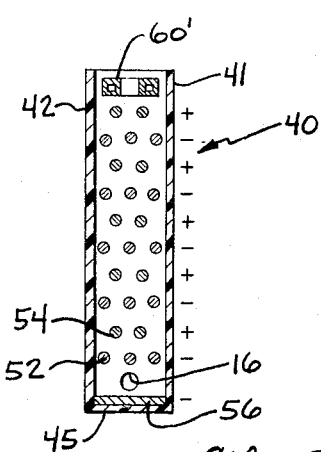
FIG. 5 is a cross-sectional view taken along line 5—5 of FIG. 4.

In the embodiment shown in FIGS. 4 and 5, there is a generally V-shaped tank 40 which has vertical side walls 41 and 42 and downwardly converging side walls 43 and 44. The tank 40 is open at the top and has a substantially smaller bottom 45. The walls 41-44 and bottom 45 are preferably formed of a suitable insulative material. The shape has been found preferable since the majority of the treatment occurs adjacent the top of the tank. In this manner, the volume of the tank can be reduced without reducing its height. To put it another way, the height to effective diameter ratio is increased without reducing the area of the top and without reducing the height. The same result can be achieved with a pyramidal shaped or frustoconical shaped tank. Again, it is preferable to have more negative electrodes 52 than positive electrodes 54. Their areas are preferably in a ratio of about 3 to 2. Another feature of this embodiment is that it has a negatively charged plate 56 covering substantially the entire bottom of the tank. Again, this is to assure a large negative polar charge adjacent the effluent line 16 so as to prevent any floc from being withdrawn therethrough. Thus, including the area of the charged plate 56, the area of the negative electrodes is greater than 1½ times the area of the positive electrodes.

It has been previously indicated that the flow through tank 10 or 40 is preferably non-turbulent throughout and that the height to effective diameter ratio cooperates to this end. As another feature to this end, an influent distributor 60 or 60' is attached to the influent conduit 12 of tanks 10 and 40, respectively. The distributor is shaped to compliment the tank; distributor 60 being a circular tube, while distributor 60' is a rectangular tube. The distributor preferably spreads the influent liquid evenly over the top of the tank; but leaves enough open space for easy passage of the floc upwardly.

The embodiment illustrated in FIG. 6 includes an electroflotation tank 110 which has compartments A and B, both of which are open at the top. The walls of the tank are preferably formed of insulative material such as fiberglass, acrylic, glass, or other suitable material. The tank has an influent conduit 111 having a valve 112 interposed therein to control admission of liquid to be treated into compartment A. Conduit 111 is connected to an influent distributor 114 in compartment A. The distributor is also formed of an insulative material and is shaped to complement the compartment so that the influent liquid is distributed across the cross-sectional area of the compartment A. Thus, the distributor 114 preferably spreads the influent liquid evenly over the top of compartment A; but leaves enough open space for easy passage of floc upwardly. A similarly shaped and constructed distributor 114' is located adjacent the top of compartment B. An effluent conduit 116 withdraws purified liquid from the bottom of compartment B. A valve 117 is interposed in the effluent conduit 116 and can be coordinated with valve 112 to control the flow through the compartment A and B at a rate such that downflow in the compartments is less than the rate of rising bubbles and so that there is no turbulence therein.

As can be seen, compartments A and B are arranged for sequential flow of the liquid therethrough. For this purpose, a flow passage 118 is operatively connected to distributor 114' and to a conduit 119 which communicates with the bottom of compartment A. As can be seen, compartment A and B each have side walls a portion of which is adjacent a side wall portion of the other compartment. The adjacent portions are spaced apart to provide the flow passage 118. This is an advantageous manner of providing the flow passage; however, it is contemplated that the compartments can be widely spaced and connected by a separate conduit if desired, or that a plurality of tanks such as shown in FIGS. 2 and 4 can be arranged for sequential flow if desired.

A plurality of positive electrodes 132 made of a silicon and iron alloy, and a plurality of negative electrodes 134 made of carbon, are disposed horizontally in each of compartments A and B. In the embodiment of FIG. 6, electrodes 132 and 134 are generally circular in cross-section and the exposed area of the negative electrodes is three times that of the exposed area of the positive electrodes. Preferably, the electrodes are located adjacent the bottom of the tank with the negative electrodes below the positive electrodes so that there is a concentration of negative charge adjacent the bottom of each compartment.

To further assure that there is a large negative polar charge adjacent the bottom of each compartment, a plate 136 is provided. Each plate 136 is advantageously formed of carbon and has a plurality of orifices 137 extending therethrough for the passage of liquid. The orifices 137 are arranged uniformly across the cross-sectional area at the bottom of the compartment A or B to aid in the uniform flow of the liquid downwardly through the respective compartment. The plate and orifice design is preferably such that the flow therethrough does not cause turbulence in the body of water above the plate. Thus the plate 136 provides a negative charge at the bottom of the compartment and also aids in assuring the non-turbulent flow mentioned above.

DC current is supplied to the electrodes 132 and 134 and to plates 136 in any convenient manner. In the embodiment illustrated, a variable transformer 140 is connected to a source of AC current and to an AC to DC converter 142. The converter's negative terminal is attached to the electrodes 134 and plate 136 by means of line 144; while the electrodes 132 are connected to the positive terminal by line 146.

As explained previously, the downflow of liquid through compartments A and B is regulated so that it is at a rate less than the rate of the rising bubbles generated by electrolysis. It will be noted that the flow in passage 118 is upwardly and that passage 118 is open at the top. Thus the compartments and the passageway are all open at the top and any floc may rise to the top of the tank 110. Any floc which rises is removed from the surface by a conveyor generally designated 122. While the floc may be removed by any acceptable means, the conveyor 122 is shown as extending across the tops of both compartments and as having a plurality of paddles 123 mounted on a continuous band 124 which travels around driven rollers 125 and 126. A trough 127 receives the discharged floc for subsequent disposal. It will be noted that a conveyor 122 is arranged to move the floc in the direction from the compartment B toward compartment A and from compartment A to the trough.

It is now deemed obvious that the above-described apparatus provides a new and useful electroflotation apparatus in which the tank is arranged to provide a non-turbulent flow of liquid directly counter to the flow of the gas bubbles. Each tank or compartment also has a multiplicty of electrodes which are arranged to provide a negatively charged zone adjacent the bottom of the tank. An additional plate is arranged in two of the embodiments to provide additional negatively charged area.

While preferred embodiments of the invention have herein been illustrated and described, this has been done by way of illustration and not limitation, and the invention should not be limited except as required by the scope of the appended claims.

The embodiments of the invention in which an exclusive property or privilege is claimed are defined as follows:

1. An electroflotation apparatus for purification of liquids, comprising
   a. a first compartment having a bottom end and a top end;
   b. supply means adjacent the top end of the first compartment for the introduction of liquid and for distributing said liquid over the cross-sectional area of the first compartment;
   c. outlet means adjacent the bottom of the first compartment for the withdrawal of liquid therefrom;
   d. a second compartment having bottom and top ends at about the same levels as the respective ends of the first compartment;
   e. conduit means connected to the outlet means of the first compartment for directing the liquid therefrom to the second compartment and for distributing said liquid over the cross-sectional area of the second compartment;
   f. discharge means adjacent the bottom end of the second compartment for the withdrawal of liquid from the compartment;
   g. a plurality of electrodes disposed substantially horizontally one above the other in each compartment and connected to a source of electricity to produce an upwardly flow of gas bubbles by electrolysis of the liquid flowing downwardly through the compartments;
   h. the total negative electrode area being greater than the total positive electrode area in each compartment, and there being a concentration of negative electrode area adjacent the bottom end of at least the second compartment to thereby provide a negatively charged zone adjacent said discharge means; and
   i. means associated with the supply and discharge means for controlling the flow of liquid downwardly through the compartments in a non-turbulent manner, counter to the upwardly flow of gas bubbles, and at a velocity less than that of the rising bubbles.

2. An electroflotation apparatus as set forth in claim 1 including means at the top ends of the compartments for removing floc carried to the liquid surface of the compartments by the upwardly flowing gas bubbles.

3. An electroflotation apparatus as set forth in claim 1 wherein the first and second compartments each have side walls a portion of which is adjacent a side wall portion of the other compartment; said adjacent portion being spaced apart to provide a flow passage therebetween; and the flow passage defining at least a portion of said conduit means.

4. An electroflotation apparatus as set forth in claim 3 wherein the side walls are formed of insulative material.

5. An electroflotation apparatus as set forth in claim 1 in which the area of negative electrodes is at least one and one-half times the area of the positive electrodes.

6. An electroflotation apparatus as set forth in claim 1 including a negatively charged surface across substantially the entire bottom of at least one of the tanks to repel the floc.

7. An apparatus for the purification of liquid by electroflotation comprising: a plurality of compartments open at the top and arranged for sequential flow of liquid through each compartment; said flow being downwardly through at least two compartments; a plurality of electrodes in each compartment between the top and bottom thereof to produce an upward flow of gas bubbles by electrolysis of the liquid treated; said electrodes including a multiplicity of spaced cathodes and anodes; the total area of the cathodes in each compartment being greater than the total area of the anodes in each compartment; means for controlling the downflow of liquid through the compartments so that the downflow is at a velocity less than that of the rising gas bubbles; and means at the top ends of the compartments for removing floc carried to the liquid surface of the compartments by the rising gas bubbles.

8. Apparatus according to claim 7 in which each compartment containing electrodes has walls formed of insulative material.

9. Apparatus according to claim 8 including a negatively charged surface across substantially the entire bottom of at least one compartment to repel the floc.

10. Apparatus according to claim 7 in which the area of the cathodes is at least one and one-half times the area of the anodes.

11. Apparatus according to claim 10 including a negatively charged surface across substantially the entire bottom of at least one compartment.

12. Apparatus according to claim 11 wherein the negatively charged surface has a plurality of openings therethrough for the passage of the treated liquid, said openings being arranged for equalizing the flow over the cross-sectional area of the compartment.

13. Apparatus according to claim 12 wherein each compartment containing electrodes has walls formed of insulative material.

14. An electroflotation apparatus for purification of liquids, comprising
   a. a tank having a bottom end and a top end;
   b. supply means adjacent the top end of the tank for the introduction of liquid to be purified and for distributing said liquid over the cross-sectional area of the tank;
   c. discharge means adjacent the bottom end of the tank for the withdrawal of purified liquid from the tank;
   d. a plurality of anodes and cathodes disposed substantially horizontally one above the other in the tank between the top and bottom and connected with a source of direct current electricity to produce an upwardly flow of gas bubbles by electrolysis of the liquid flowing downwardly through the tank;
   e. a cathode surface extending across substantially the entire bottom of the tank and connected with said source of direct current electricity to provide said negative charge;
   f. the total area of the cathodes, including said cathode surface being greater than the total anode area in the tank; and
   g. means associated with the supply and discharge means for controlling the flow of liquid downwardly through the tank in a non-turbulent manner, counter to the upwardly flow of gas bubbles, and at a velocity less than that of the rising bubbles.

15. An electroflotation apparatus as set forth in claim 14 in which the cathode surface extending across substantially the entire bottom of the tank is a solid plate.

16. An electroflotation apparatus as set forth in claim 14 in which the cathode surface extending across substantially the entire bottom of the tank has a plurality of openings therethrough for the passage of the treated liquid, said openings being spaced across the bottom of the tank and arranged for equalizing the flow over the cross-sectional area of the tank.

17. An electroflotation apparatus for purification of liquids, comprising
   a. a tank having a side wall, a bottom end, and an open top end;
   b. wall means extending generally the full height of the tank side wall and cooperating therewith to provide an upwardly extending flow passage, the flow passage being open at the top;
   c. an inlet at the bottom of the flow passage for the upwardly flow of liquid to be purified;
   d. supply means adjacent the top end of the tank and communicating with the flow passage for the introduction of the liquid to be purified and for distributing said liquid over the cross-sectional area of the tank;
   e. discharge means adjacent the bottom end of the tank for the withdrawal of purified liquid from the tank;
   f. a plurality of electrodes disposed substantially horizontally one above the other in the tank and connected with a source of electricity to produce an upwardly flow of gas bubbles by electrolysis of the liquid flowing downwardly through the tank;
   g. the total negative electrode area being greater than the total positive electrode area in the tank, and there being a concentration of negative electrode area adjacent the bottom end of the tank to thereby provide a negatively charged zone adjacent said discharge means; and
   h. means associated with the supply discharge means for controlling the flow of liquid downwardly through the tank in a non-turbulent manner, counter to the upwardly flow of gas bubbles, and at a velocity less than that of the rising bubbles.

18. The combination of claim 17 including means at the top of the tank for removing floc from the surface of the liquid in the tank.

19. The combination of claim 17 including a second tank adjacent the first tank and arranged for downflow of liquid therethrough, the second tank having a plurality of electrodes therein for electrolysis of the liquid passing therethrough, and the second tank having an outlet connected to the inlet of the flow passage for sequential flow of the liquid through the tanks.

20. The combination of claim 19 in which the wall means of the flow passage defines part of the side wall of the second tank, the second tank is also open at the top and the top is generally at the same level as the top of the first tank; and including means at the top of the tanks for removing floc from the surfaces of the liquids therein and also from the surface of the flow passage.

* * * * *